(12) United States Patent
Linares

(10) Patent No.: US 11,561,032 B2
(45) Date of Patent: Jan. 24, 2023

(54) MAGNETIC INDUCTION WATER HEATER/CHILLER WITH SEPARATE HEATING/CHILLING ZONES

(71) Applicant: Heat X, LLC, Auburn Hills, MI (US)

(72) Inventor: Miguel A. Linares, Bloomfield Hills, MI (US)

(73) Assignee: Heat X, LLC, Auburn Hills, MI (US)

( * ) Notice: Subject to any disclaimer, the term of this patent is extended or adjusted under 35 U.S.C. 154(b) by 26 days.

(21) Appl. No.: 17/095,817

(22) Filed: Nov. 12, 2020

(65) Prior Publication Data
US 2021/0140687 A1    May 13, 2021

Related U.S. Application Data

(60) Provisional application No. 62/934,040, filed on Nov. 12, 2019.

(51) Int. Cl.
*F25B 21/00*     (2006.01)

(52) U.S. Cl.
CPC ...... *F25B 21/00* (2013.01); *F25B 2321/0022* (2013.01)

(58) Field of Classification Search
CPC ............. F25B 21/00; F25B 2321/0022; G05D 23/1919
See application file for complete search history.

(56) References Cited

U.S. PATENT DOCUMENTS

| | | | |
|---|---|---|---|
| 4,507,927 A * | 4/1985 | Barclay | F25B 21/00 505/891 |
| 4,599,866 A * | 7/1986 | Nakagome | F25B 21/00 505/891 |
| 5,182,914 A * | 2/1993 | Barclay | F25B 21/00 505/894 |
| 5,286,942 A * | 2/1994 | McFadden | G05D 22/02 261/142 |
| 5,334,819 A | 8/1994 | Lin | |
| 6,453,677 B1 * | 9/2002 | Arman | F17C 3/04 62/3.1 |

(Continued)

FOREIGN PATENT DOCUMENTS

| | | |
|---|---|---|
| JP | 2000-058239 A | 2/2000 |
| KR | 10-1489025 B1 | 2/2015 |

OTHER PUBLICATIONS

International Search Report and Written Opinion issued by the Korean Patent Office acting as International Searching Authority for International Patent Application No. PCT/US2020/060168 dated Feb. 26, 2021 (10 pages).

*Primary Examiner* — Gordon A Jones
(74) *Attorney, Agent, or Firm* — Dinsmore & Shohl LLP

(57) ABSTRACT

A fluid thermal conditioning (heating/cooling) system including a housing containing a fluid holding tank and having an inlet pipe and an outlet pipe. A drive shaft rotatably supports either of a conductive plate or a plurality of spaced apart magnetic or electromagnetic plates positioned within the housing. The conductive plate can be reconfigured as an elongated conductive component supported within the housing and including a plurality of individual plates which alternate in arrangement with axially spaced and radially supported magnetic/electromagnetic plates. Upon rotation of the shaft, an oscillating magnetic field is generated for thermally conditioning the fluid.

7 Claims, 10 Drawing Sheets

(56) References Cited

U.S. PATENT DOCUMENTS

| | | | |
|---|---|---|---|
| 6,758,046 B1* | 7/2004 | Barclay | F25C 1/142 |
| | | | 62/340 |
| 8,418,832 B1* | 4/2013 | Albertson | F25B 15/00 |
| | | | 219/628 |
| 2003/0051774 A1* | 3/2003 | Saito | H01F 1/015 |
| | | | 148/302 |
| 2006/0086729 A1 | 4/2006 | Lunneborg | |
| 2006/0213446 A1 | 9/2006 | Atlas et al. | |
| 2009/0223948 A1 | 9/2009 | Hess | |
| 2011/0061398 A1* | 3/2011 | Shih | F25B 21/00 |
| | | | 62/3.1 |
| 2011/0215089 A1* | 9/2011 | Garza | H05B 6/04 |
| | | | 219/628 |
| 2013/0062340 A1* | 3/2013 | Hsu | F24V 99/00 |
| | | | 219/600 |
| 2019/0093904 A1 | 3/2019 | Aquareturn | |

* cited by examiner

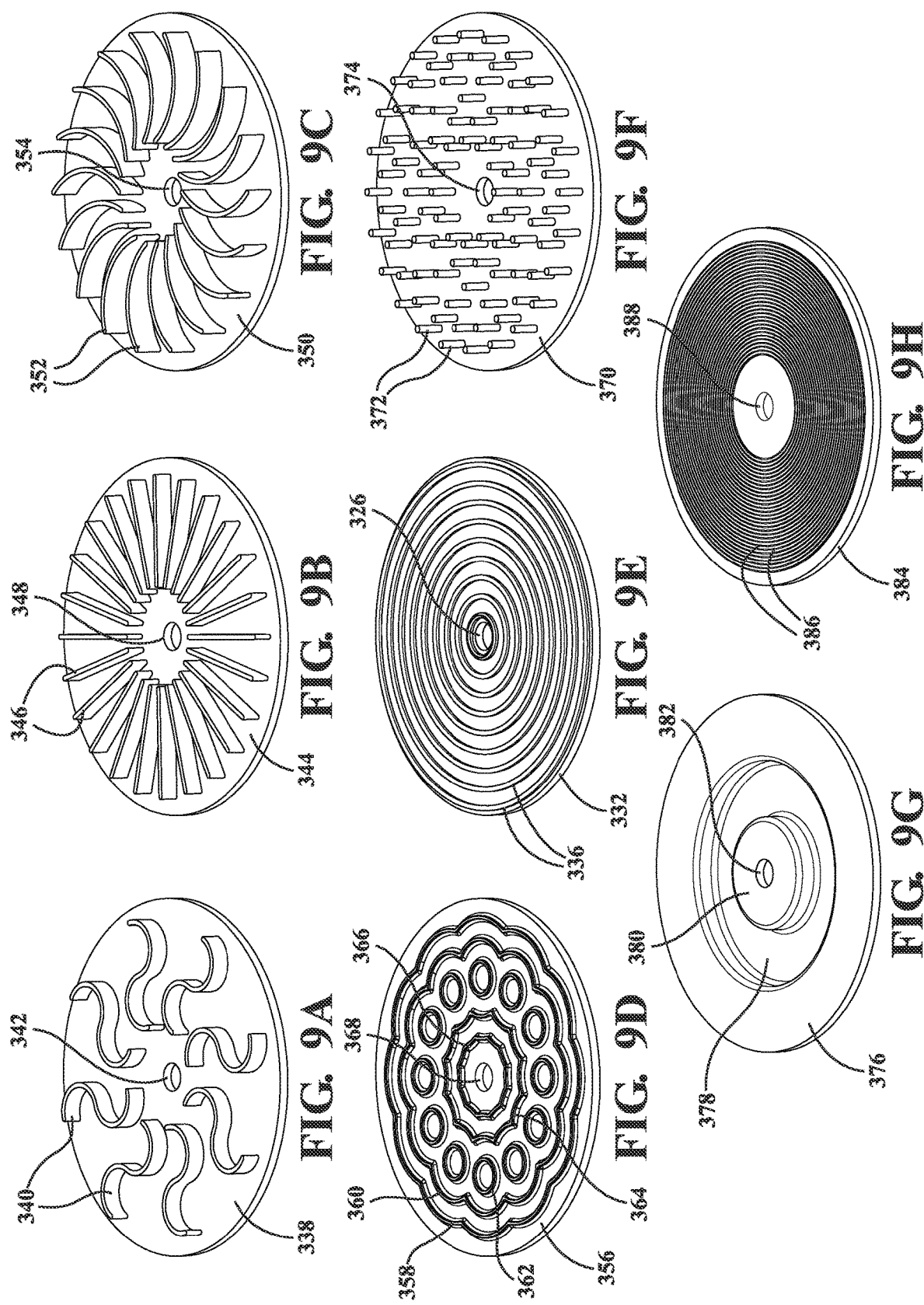

MAGNETIC INDUCTION WATER HEATER/CHILLER WITH SEPARATE HEATING/CHILLING ZONES

CROSS REFERENCE TO RELATED APPLICATIONS

The present application claims the priority of U.S. Ser. No. 62/934,040 filed Nov. 12, 2019.

BACKGROUND OF THE INVENTION

The phenomena of magnetic or electromagnetic induction heating is well known in the prior art by which heat is generated in an electrically conductive object by the generation of eddy currents, this also referenced as Joule heating. The typical induction heater includes an electronic oscillator which passes a high frequency alternating current through an electromagnet. The eddy currents flowing through the resistance of a conductive metal placed in proximity to the magnet/electromagnet in turn heat it. Put another way, the eddy currents result in a high-frequency oscillating magnetic field which causes the magnet's polarity to switch back and forth at a high-enough rate to produce heat as byproduct of friction.

One known example of a prior art induction heating system is taught by the electromagnetic induction air heater of Garza, US 2011/0215089. Also referenced is the centrifugal magnetic heating device of Hsu 2013/0062340 which teaches a power receiving mechanism and a heat generator.

SUMMARY OF THE PRESENT INVENTION

The present invention relates generally to a fluid conditioning system or assembly in the form of an electromagnetic or magnetic induction water heating/chilling assembly or magnetocaloric fluid heat pump. More specifically, the present invention discloses a hybrid tank or tankless magnetic induction water heater/chiller which incorporates an elongated and rotating magnet or electromagnetic array. A plurality of heat/chill conductive disks or plates are arranged in proximity to the rotating magnet/electromagnetic plates for thermally conditioning a fluid communicated through the conductive array between inlet and outlet locations in order to provide on demand conditioned (heated or chilled) fluid.

In an exemplary embodiment, a fluid thermal conditioning system includes a housing containing a fluid holding tank and having an inlet pipe and an outlet pipe. A drive shaft extends within the housing and rotatably supports a plurality of spaced apart magnetic or electromagnetic plates. A conductive component is supported within the housing and includes a plurality of individual conductive elements, these including in a first variant conductive plates which are in communication with at least the inlet pipe, with the conductive plates alternating with the magnetic/electromagnetic plates. Upon rotation of the magnetic/electromagnetic plates, an oscillating magnetic field being generated, with fluid circulating through the conductive plates being thermally conditioned.

The individual conductive plates each include linearly spaced apart and radially projecting fluid communicating packages, with the inlet and outlet pipes extending through a common manifold and communicating with individual inlet and outlet locations of each of the fluid communicating packages. A motor or other input drive is provided for rotating the shaft and magnetic/electromagnetic plates. The motor or input drive can be of a synchronous or asynchronous variety and may be located either within or outside of the housing. The power supply can be throttled or regulated to the motor or input drive for selectively increasing or decreasing in order to adjust a speed of rotation of the magnetic/electromagnetic plates.

Each of the conductive plate fluid communicating packages can further include a pair of conductive plates which, upon being assembled together, define an interior fluid pathway extending through each package. The interior pathways each further include any plurality of extending or spiraling lengths interconnected about an interior circumference of the assembled package. Each of the magnetic/electromagnetic plates and conductive packages can each further include a circular shape.

In one application, the present system can provide production of on-demand conditioned fluid and without the need of a separate holding tank. In further applications, the motor or input drive and shaft is configured to selectively activating or deactivating any sub-plurality of magnetic/electromagnetic plates. It is also envisioned that any sub-plurality of the fluid communicating packages can be deactivated through any suitable valve design associated with each of the individual fluid inlet and outlet locations.

In a specific variant, the plurality of spaced apart magnetic/electromagnetic plates and alternating conductive plates are contained within the tank and immersed within the fluid. A pair of inlet and outlet valves are positioned outside the tank and connecting with a first subset pair of said inlet and outlet pipes, with a second subset pair of inlet and outlet pipes extending into the tank.

Recirculation pipes extend from the valves which are interconnected at a central manifold, an associated controller being operable to switch the valves between a first operational mode in which non-conditioned fluid is drawn into the inlet pipe and thermally conditioned fluid is withdrawn through the outlet pipe. In a second recirculation mode the first subset pair of inlet and outlet pipes are closed so that previously admitted fluid is recirculated through the recirculation pipes and the second pair of inlet and outlet pipes for continual thermal conditioning.

In a further variant, the plurality of spaced apart magnetic or electromagnetic plates alternate with a further variant of conductive elements reconfigured as conductive plates are contained within a separate enclosure of the housing outside of the tank. In this configuration, the inlet pipe includes first and second subset inlet pipes, a valve positioned outside of the tank and interconnecting the first and second subset inlet pipes.

Recirculation pipes extend from the tank to a central manifold and from the manifold to the valve. An associated controller is operable to switch the valve between a first operational mode in which non-conditioned fluid is drawn into said inlet pipe and thermally conditioned fluid is withdrawn through the outlet pipe and a second recirculation mode in which the first subset inlet pipe and the outlet pipe are closed so that previously admitted fluid is recirculated through the recirculation pipes and the conductive component for continual thermal conditioning.

The plurality of spaced apart magnetic/electromagnetic plates and alternating plurality of individual conductive plates can further include dual stage upper and lower rotating magnetic/electromagnetic plate arrays in combination with proximately located fluid conditioning conductive disks or plate arrays. The upper and lower fluid conditioning disks or plate arrays can be integrated into a pair of upper and lower conductive components which are supported within the interior of the tank.

In a yet further variant, the upper and lower conductive components each further comprising a rib and spline configuration alternating with the pluralities of magnetic/electromagnetic plates for maximizing thermal conductive flow of the fluid through thermally conditioning (heating and cooling) zones, and which are optimized at the locations of the inter-rotating magnet/electromagnet arrays for providing conditioned fluid.

Additional variants include a fluid conditioning assembly having a housing containing a fluid holding tank to which is communicated each of an inlet pipe and an outlet pipe. A drive shaft (such as operated by a motor or other rotating input) is supported within the housing and extends within the tank and so that the shaft rotatably supports a fluid agitating (impeller or baffle) component. At least one magnetic or electromagnetic plate is supported within either of the housing or tank. A fluid conditioning and conductive component is also supported within the tank and in proximity to the magnetic or electromagnetic plate. Upon the drive shaft rotating either of the magnetic/electromagnetic plate or the conductive component, oscillating magnetic fields are generated, with the fluid within the tank being thermally conditioned.

Subset features include the impeller being constructed of a conductive material and arranged in proximity to a selected one of the magnetic or electromagnetic for creating additional oscillating magnetic fields within the tank. In a further sub-variant the fluid conditioning and conductive component further includes top and bottom conductive plates integrated into a liner of the tank, the magnetic or electromagnetic plate further being a pair of top and bottom plates arranged within the housing outside of the tank.

The fluid agitating baffle construction can also be presented as inner and outer shells enclosing both the magnetic or electromagnetic plates and the conductive component or plate. The conductive component further can specifically include a plate exhibiting an arrangement of thermal conditioning and fluid redirecting elements projecting from a surface thereof. Other features include a plurality of housings provided in any of a scaled or modularized configuration.

BRIEF DESCRIPTION OF THE DRAWINGS

Reference will now be made to the attached drawings, when read in combination with the following detailed description, wherein like reference numerals refer to like parts throughout the several views, and in which:

FIGS. 9A-9H depict a variety of conductive plate configurations which can be incorporated into any of the various embodiments of water heating/chilling assemblies or magnetocaloric fluid heat pumps described herein.

DETAILED DESCRIPTION OF THE PREFERRED EMBODIMENTS

Figure 1:
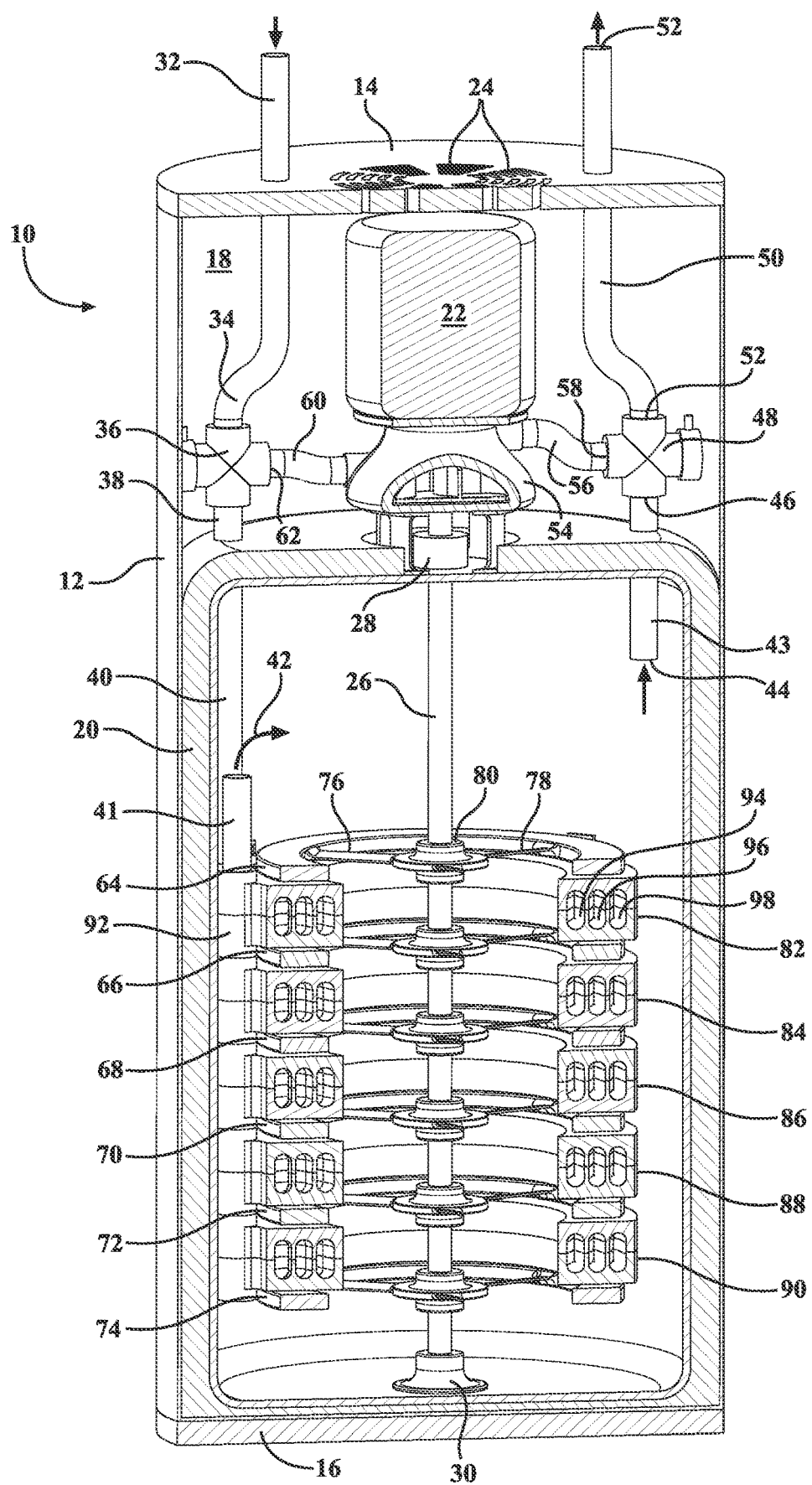
FIG. 1 is a perspective length cutaway illustration of an electromagnetic or magnetic induction water heating/chilling assembly or magnetocaloric fluid heat pump according to a first embodiment of the present invention and including an upper enclosure located motor with inlet and outlet valves operable between opened positions for providing conditioned fluid as well as closed positions for providing recirculation of previously conditioned fluid through conductive disk or plate arrays.
Figure 2:
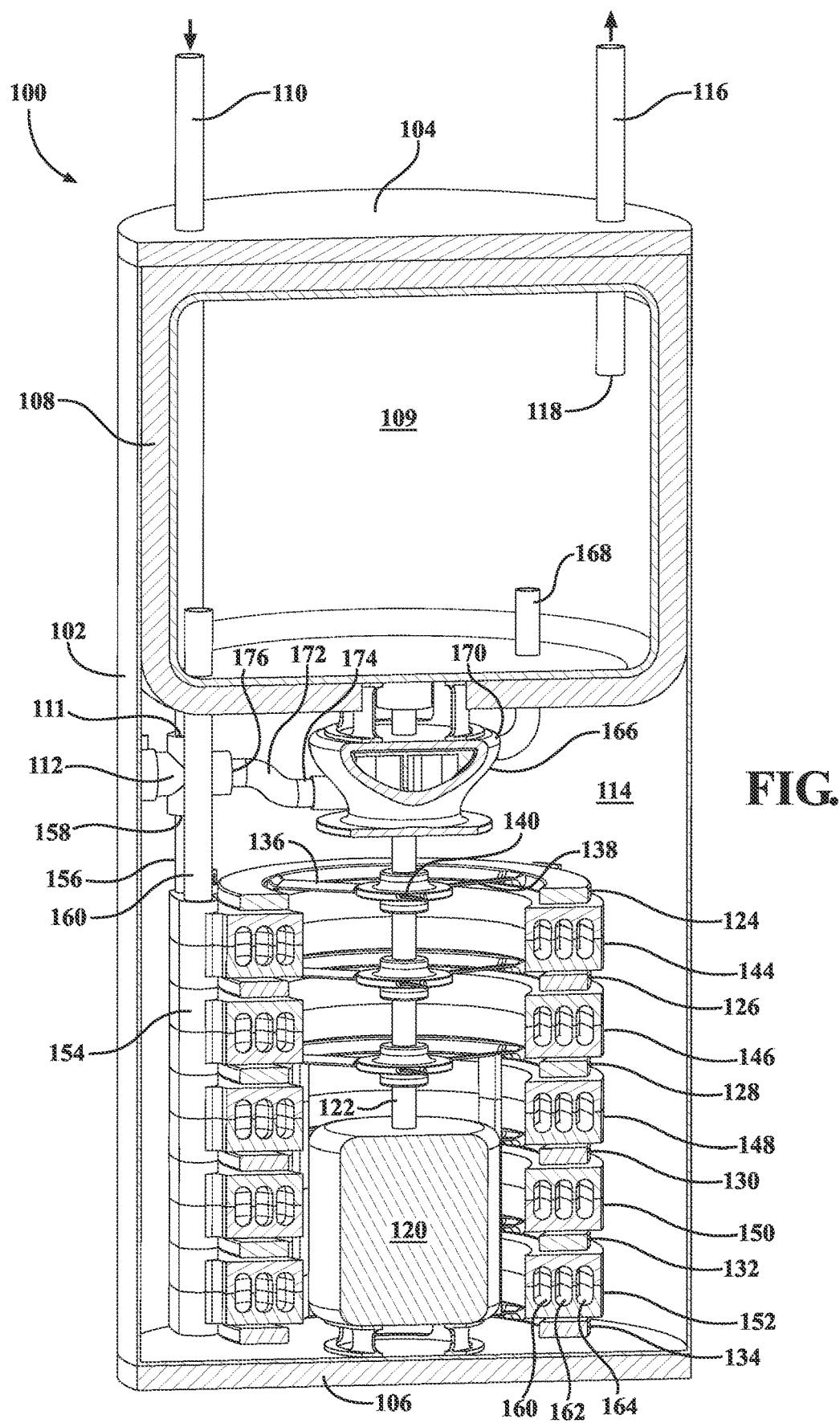
FIG. 2 is a similar perspective illustration to that shown in FIG. 1 and depicting an alternate arrangement of an electromagnetic or magnetic induction water heating/chilling assembly or magnetocaloric fluid heat pump according to a second embodiment of the present invention and including a lower enclosure located motor or input drive and combination rotating magnetic/electromagnetic arrays and proximately located fluid conditioning conductive disks or plate arrays, in combination with an upper located fluid holding tank for providing on-demand conditioned fluid.
Figure 3:
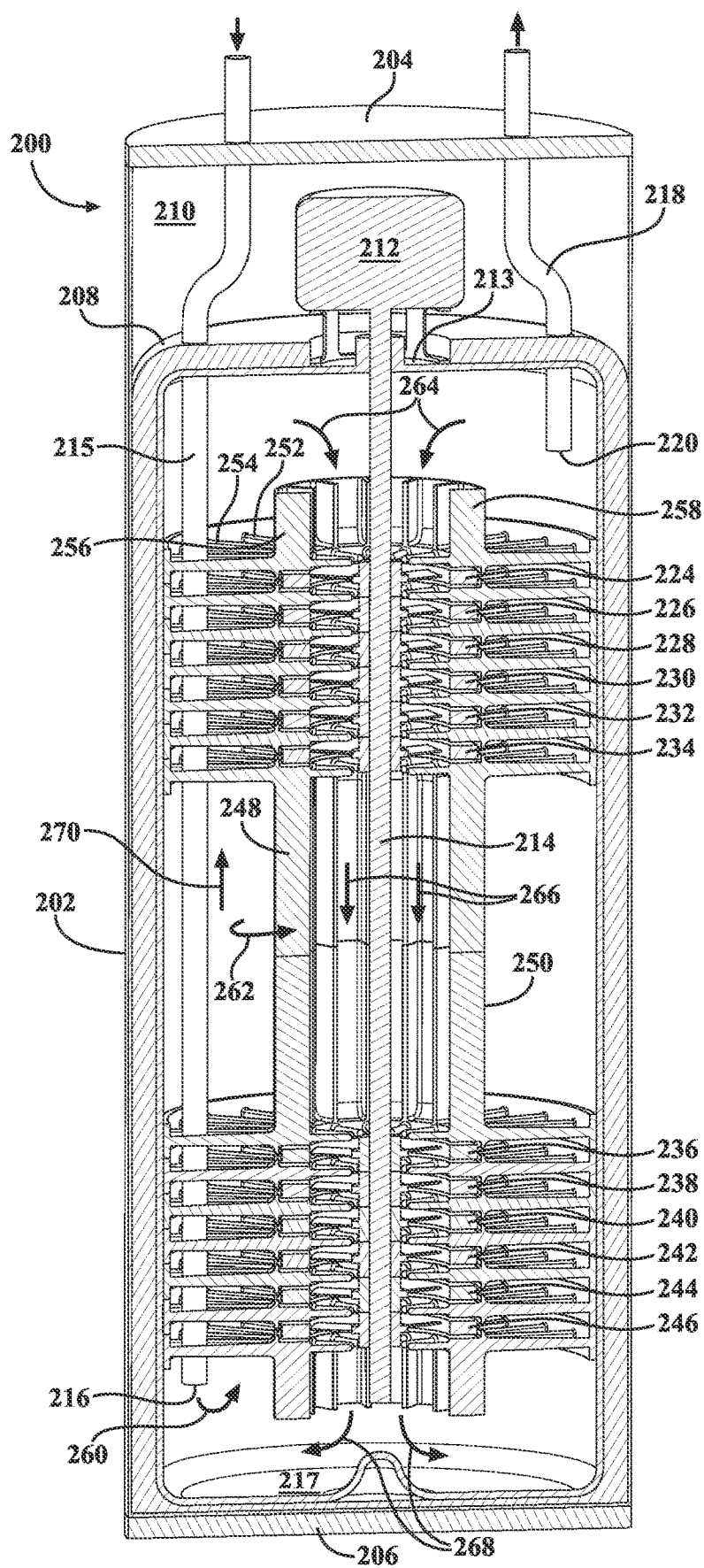
FIG. 3 is a further similar perspective illustration and depicting a further variant of an electromagnetic or magnetic induction water heater/chilling assembly or magnetocaloric heat pump according to a third embodiment of the present invention and including a lower main enclosure with dual stage upper and lower rotating magnetic/electromagnetic plate arrays in combination with proximately located fluid conditioning conductive disks or plate arrays further having rib and spline configurations for maximizing thermal conductive flow of the fluid through thermally conditioning (heating and cooling) zones optimized at the locations of the inter-rotating magnet/electromagnet arrays for providing conditioned fluid.

With reference to the following description, the present invention discloses a number of non-limited embodiments of either of magnetic or electromagnetic induction water heaters/chillers or magnetocaloric heat pumps, examples of which are illustrated in each of FIGS. 1-3. For purposes of clarity of description, the detailed description will describe as follows elements associated with a magnetic induction water heater, it being further understood that reference to the conductive heating elements in the present description are readily interchangeable to described a suitable chiller assembly in potential alternate variants, such relying on utilizing any of a magneto caloric heat pump, active magnetic regenerator, magnetic/magnetocaloric refrigerator, or magnetic/electromagnetic air conditioner (in the instance in which air is the circulated fluid).

With reference initially to FIG. 1, a perspective length cutaway illustration is generally depicted at 10 of an electromagnetic or magnetic induction water heating/chilling assembly or magnetocaloric fluid heat pump according to a first embodiment of the present invention and includes a housing configured (without limitation) in a generally cylindrical shape with a curved height extending side wall 12 and enclosed by each of a top 14 and a bottom 16. The housing is internally separated by an upper sub-chamber 18 and a lower chamber which is further defined by a tank 20.

The upper chamber 18 or upper enclosure contains a motor or input drive 22 or other rotating drive assembly and which can include, without limitation, any electric synchronous or asynchronous motor or input drive. The motor or input drive 22 is further depicted positioned below the top 14 of the enclosure, the latter further including grate or vent apertures 24, with the further understanding that the motor or input drive 22 or other rotating drive can be repositioned outside of the housing. A shaft 26 extends downwardly from the motor 22 or input drive (or other rotating drive) and, via a pair of upper 28 and lower 30 bearing arrangements, is supported in vertically extending fashion through the lower chamber defined tank 20.

An inlet pipe 32 is provided for communicating an inlet fluid, such as which can be provided under any pressure and which is not limited to any type of liquid or gas (typically including a liquid such as water but also envisioning other fluids not limited to glycols or other liquid/gaseous compositions). The inlet pipe 32 connects to a first inlet location 34 of a three direction inlet valve 36 secured within the upper chamber 18. A second outlet location 38 of the inlet valve communicates with a further length of pipe 40 extending within the main lower enclosure situated tank 20.

An outlet pipe network includes a first lower-most pipe length 41 projecting a partial distance above a conductive element stack or array (further described below) for delivering a conditioned fluid flow (see arrow 42) within an open interior of the tank. A second length of pipe 43 extends from an open mouth end 44 projecting a partial distance into the uppermost region of the tank 20 and upwardly into a first inlet location 46 of a three direction outlet valve 48 which is shown secured within the upper chamber 18 on an opposite side relative to the inlet valve 36.

During normal fluid delivery, a second outlet pipe length 50 in communication with a second outlet location 52 of outlet valve 48 delivers conditioned fluid through an end location 52 projecting from the enclosure top 14. The inlet pipe/conduit 32 and outlet pipe/conduit 50 in this variant define a first subset pair of conduits, with the additional inlet pipe 40 and outlet pipe 43 defining a second subset pair.

A central manifold 54 is provided within the upper chamber 18 and is communicated by each of a conditioned side recirculation pipe 56 extending to a third location 58 of the outlet valve 48, as well as an inlet valve extending recirculation pipe 60 extending to a third location 62 of the inlet side valve 36. Upon the actuation of the inlet 36 and outlet 48 valves to close their respective inlet 34 and outlet 52 locations and concurrently open their recirculation locations 58 and 62, fluid flow is redirected from the outlet pipe 42 through the manifold 54 and recirculated into the main lower tank 20.

The three position inlet valve 36 and outlet valve 48 can each be constructed of any suitable design not limited to a gate or ball valve configuration and including appropriate controls for alternatively opening and closing the inlet side locations 34/62 and outlet side locations 52/58 in order to accommodate either of direct conditioned fluid flow (single pass through the tank interior) or recirculation flow (in the latter instance envisioned to be provided along with an appropriate thermostat or other control in order to continuously recondition a specific volume of fluid within the interior of the tank 20 to provide on demand heated or cooled fluid. Apart from shutting off inlet fluid flow to the assembly, a direct fluid bypass (maintenance) condition can also be accommodated to permit access to the tank interior and by closing both of the second outlet location 38 of the inlet valve 36 and the first inlet location 46 of the outlet valve 48, by which fluid flow is redirected from inlet pipe length 32, through bypass length 60, manifold 54, bypass length 56, and out through outlet pipe length 50 in a direction counter to normal closed loop recirculation flow.

With reference again to FIG. 1, the lower positioned tank 20 shown in lengthwise perspective cutaway of the electromagnetic induction water heater/chiller and by which the central shaft 26 supports a plurality of spaced apart magnetic or electromagnetic disks or plates, and which are depicted in one non-limiting arrangement at 64, 66, 68, 70, 72, and 74 arranged in axially spaced apart fashion. The magnetic/electromagnetic plates 64-74 are each further connected by radial directed struts and a central bearing or other support, and which is represented in non-repetitive fashion by struts 76 and 78 extending from inner surface locations of the upper most located disk or plate 64 and inwardly to an associated central bearing support 80.

Although not shown, the individual magnetic/electromagnetic plates or disks can be constructed entirely of a magnetic/electromagnetic material or can include subset magnetic/electromagnetic elements or locations which can further include individual pockets arranged in a circumferential array for each plate or disk, and within which can be contained any of individual magnets or electromagnets. Without limitation, the magnetic/electromagnetic plates can also integrate any of a variety of rare earth or electromagnetic components arranged in any configuration within and around the circumference of the individual plates 64-74. In another non-limiting example, the pockets may be non-cylindrically shaped, such as, but not limited to, square, rectangular, trapezoidal, triangular, or other desired geometric profile. In one non-limiting example, the pockets are not uniform but instead include at least two different geometric profiles. In another non-limiting example, the magnetic/electromagnetic plate may include either pockets for seating individual magnets/electromagnets or be provided with no pockets and instead constructed as a solid plate defining a magnet/electromagnet.

The previously referenced conductive component (also partially depicted in cutaway) includes a plurality of individual disk packages 82, 84, 86, 88, and 90 stationary mounted within the tank 20 in alternating arrangement with the magnet/electromagnet plates 64, 66, 68, 70, 72, and 74. An elongated and vertically extending conductive component manifold 92 is integrated into each successive conductive disk package 82-90 and, as shown, receives the inlet pipe length 40 at a first location as well as the partial outlet pipe length 41 at a further location.

The individual conductive packages can, without limitation, each include separately milled or machined interior profiles and which, upon assembly, incorporate any unique configuration of interior channels or pathways which are in individual communication with the common fluid manifold 92 for circulating the fluid, such as according to any serpentine fashion within and along an overall circumferential pattern between individual inlet and outlet locations (representatively shown by spiral winding interior pathway locations 94, 96, and 98 for uppermost selected conductive package 82).

Without limitation, it is also envisioned that the conductive packages can be tied together in parallel to the common fluid conduit 92 to provide a ready supply of on demand hot or chilled water or other fluid, and can alternatively be communicated in series to optimize heating/chilling of fluid by prolonging the exposure of the fluid to the magnetized conductive plates if heated or demagnetized conductive plates cooled/chilled. Upon passing through a desired single or networked plurality of conductive disk packages 82-90, the fluid is outputted through partial upward projecting pipe location 41 and introduced into the interior of the tank 20 for eventual withdrawal through outlet pipe 43. The ability to immerse the rotating magnet/electromagnet plate arrays and associate conducted disk packages within the fluid allows for additional and further conditioning (heating or cooling) to occur additional to the fluid being simultaneously communicated through the interior pathways or channels of each disk package.

Further, varying magnetic fields are generated via the rotation of the magnetic/electromagnetic plates 64-74 to inductive heat (according to the illustrated embodiment) or magneto-calorically cool both the spaces between the magnetic or electromagnetic plates 64-74 and the alternating arranged conductive disk packages 82-90, this owing to the alternating fields generated by the rotation of the proximate located magnets/electromagnets to frictionally heat (or cool) and include eddy currents that travel (via convection and conduction) into the conductive plates packages and dissipate in form of heat/cooling losses that conductively condition the fluid circulating through the individual pathways 94, 96, 98, within each of the packages as well as again providing additional thermal conditioning to the fluid surrounding and immersing the array. Associated thermostat controls can be utilized in order to cycle the motor or input drive 22 on periodically in order to keep the plates constantly warm (or chilled in an optional magneto caloric heat pump variant), such further optionally occurring without necessarily having fluid flowing through the conductive fluid heating packages. Other features can include valving or other structure integrated into the individual conductive disk packages for selectively providing thermal conditioning flow through some or all of the packages.

Without limitation, the configuration and material selection for each of the magnetic or electromagnetic plates 64-74 can be selected from any material not limited to rare earth metals and alloys and which possesses properties necessary to generate adequate oscillating magnetic fields for inducing magnetic or electromagnetic heating, such again resulting from the ability to either maintain or switch the magnet polarity at a sufficiently high rate in order for the generated friction to create the desired heat/cold profile. The conductive fluid communicating packages 82-90 can be constructed, without limitation, of a ferromagnetic, ferrimagnetic, antiferromagnetic, paramagnetic or diamagnetic properties or any combination of these materials and respond to the oscillating fields generated via magnetic induction such that they create eddy currents and Joule heating.

The relative speed of rotation of the magnetic/electromagnetic plates arrays 64-74 can be modified to vary an intensity of the fields created and, thereby, the degree of conductive heat communicated to the fluid being communicated through the individual disk packages. It is further noted, without limitation, that the invention contemplates in one non-limiting embodiment having all of the conductive packages concurrently circulating and heating/chilling fluid from the common line or manifold 92 in order to provide a steady and pressurized flow of conditioned fluid, which is initially delivered through the inlet fluid line 40, through the outlet conduits 41, 43, and 50.

Additional non-limiting variants further envision the ability to utilize appropriate valves or controls in order to selectively activate/deactivate fluid flow through some or all of the disk packages 82-90 in order to modify the volume of conditioned fluid being delivered from the water heater/chiller assembly 10, such further contemplating engaging or disengaging the rotation of specified ones of the magnetic/electromagnetic plates 64-74 dependent upon whether specific ones of the disk packages are active or inactive and connecting or disconnecting an electric supply, as well as varying intensity by increasing or decreasing power supply to the electromagnets of the disk packages that are active and engaged, if electromagnets are used, via the motor or other rotary inducing input RPM (input drive) or rotational speed to accomplish best performance in terms of efficiency or COP (coefficient of performance). Beyond the recirculation mode previously described, it is also envisioned that the associated valving/controls for the present assembly can be further designed in order to successively pass conditioned fluid through multiple (including consecutive or non-consecutive) conductive disk packages, such as in order to modify a desired fluid holding or delivery temperature.

FIG. 2 is a similar perspective illustration, generally at 100, to that shown in FIG. 1 and depicting an alternate arrangement of an electromagnetic or magnetic induction water heating/chilling assembly or magnetocaloric fluid heat pump according to a second embodiment of the present invention. A similar housing construction is again depicted in non-limiting representation by cylindrical shaped body 102 with a top 104 and a bottom 106.

An upper enclosure of the housing includes a tank 108 which defines a volume holding interior 109 for holding a volume of an on-demand conditioned fluid. An inlet flow line 110 extend from an external location, through the tank 108 and into a first inlet location 111 of three position valve 112 located within a lower chamber defining interior 114 of the housing 102. An outlet flow line is further shown at 116 extending a partial distance from the top 104 into the interior of the upper tank 108 and includes an open mouth end 118 for withdrawing thermally conditioned (heated or cooled) fluid in an on-demand fashion and which, as will be further described, facilitates faster thermal conditioning of fluid allowing for use of a smaller holding reservoir than which is associated with conventional heating/chilling tank designs.

In contrast to the variant of FIG. 1, motor or input drive 120 is repositioned into a lowermost central area of the lower enclosure 114 in supported fashion upon the bottom 106. The inductive hearting/magneto-caloric cooling structure of FIG. 1 is generally repeated and again includes an upward extending rotating shaft 122 supporting a plurality of spaced apart magnetic or electromagnetic disks or plates, and which are depicted at 124, 126, 128, 130, 132, and 134 arranged in axially spaced apart fashion.

As previously described in reference to the embodiment 10 of FIG. 1, the magnetic/electromagnetic plates 124-134 again are each further connected by radial directed struts and a central bearing or other support, and which is represented in non-repetitive fashion by struts 136 and 138 extending from inner surface locations of the upper most located disk or plate 124 and inwardly to an associated central bearing support 140. Owing to the position of the motor or input 120, the lower three most plates 130, 132, and 134 can alternatively be supported to the central rotating shaft 122 via a bypass cage structure (see selected strut 142).

As described in FIG. 1, individual magnetic/electromagnetic plates or disks can be constructed entirely of a magnetic/electromagnetic material or can include subset magnetic/electromagnetic elements or locations which can further include individual pockets arranged in a circumferential array for each plate or disk, and within which can be contained any of individual magnets or electromagnets. Without limitation, the magnetic/electromagnetic plates can also integrate any of a variety of rare earth or electromagnetic components arranged in any configuration within and around the circumference of the individual plates 124-134.

The previously referenced conductive component (also partially depicted in cutaway) includes a plurality of individual disk packages 144, 146, 148, 150, and 152 stationary mounted within the lower enclosure in alternating arrangement with the magnet/electromagnet plates 124, 126, 128, 130, 132, and 134. An elongated and vertically extending conductive component manifold 154 is integrated into each successive conductive disk package 144-152 and, as shown, receives a further inlet pipe length 156 extending from a second location 158 of the valve 112, and at a first location of the common manifold 154, as well as the partial outlet pipe length 160 extending upwardly at a further location from the common manifold 154 and partially into the upper tank interior 109.

As described in FIG. 1, the individual conductive packages can, without limitation, each include separately milled or machined interior profiles and which, upon assembly, incorporate any unique configuration of interior channels or pathways which are in individual communication with the common fluid manifold 154 for circulating the fluid, such as according to any serpentine fashion within and along an overall circumferential pattern between individual inlet and outlet locations (representatively shown by spiral winding interior pathway locations 160, 162, and 164 for lowermost selected conductive package 152).

As compared to the variant of FIG. 1, a recirculation manifold 166 is repositioned to an upper interior location of the lower chamber 114, located beneath the tank 108. A further inlet line 168 projects partially from the tank interior 109 to an inlet location 170 of the manifold 166. A further recirculation line 172 extends between an outlet location 174 of the manifold 166 to a third location 176 of the three position valve 112.

The hybrid design of FIG. 2 allows the inlet location 111 of the three way valve 112 to be periodically closed by the associated controls, following which the motor or input drive 120 recirculates the internal fluid through the disk packages 144-152 in order to reheat the same and prior to being redeposited via pipe 160 into the tank interior 109. In this manner, the design provides for fast on-demand retrieval of thermally conditioned (heated or cooled) fluid flow without the requirement of differently sized tanks.

Without limitation, it is again also envisioned that the conductive packages can be tied together in parallel to the common fluid conduit 154 to provide a ready supply of on demand hot or chilled water or other fluid, and can alternatively be communicated in series to optimize heating/chilling of fluid by prolonging the exposure of the fluid to the magnetized conductive plates if heated or demagnetized conductive plates cooled/chilled. Upon passing through a desired single or networked plurality of conductive disk packages 144-152, the fluid is outputted through partial upward projecting pipe location 160 and introduced into the interior of the upper situated on-demand holding tank 108 for eventual withdrawal through outlet pipe 116.

Varying magnetic fields are generated via the rotation of the magnetic/electromagnetic plates 124-134 to inductive heat (according to the illustrated embodiment) or magnetocalorically cool both the spaces between the magnetic or electromagnetic plates 124-134 and the alternating arranged conductive disk packages 144-152, this owing to the alternating fields generated by the rotation of the proximate located magnets/electromagnets to frictionally heat (or cool) and include eddy currents that travel (via convection and conduction) into the conductive plates packages and dissipate in form of heat/cooling losses that conductively condition the fluid circulating through the individual pathways 160, 162, 164. Associated thermostat controls can be utilized in order to cycle the motor or input drive 120 on periodically in order to keep the plates constantly warm (or chilled in an optional magneto caloric heat pump variant), such further optionally occurring without necessarily having fluid flowing through the conductive fluid heating packages.

The relative speed of rotation of the magnetic/electromagnetic plates arrays 124-134 can again be modified to vary an intensity of the fields created and, thereby, the degree of conductive heat communicated to the fluid being communicated through the individual disk packages. As also previously noted, and without limitation, the invention contemplates having some or all of the conductive packages concurrently circulating and heating/chilling fluid from the common line or manifold 154 in order to provide a steady and pressurized flow of conditioned fluid.

Additional non-limiting variants again further envision the ability to utilize appropriate valves or controls in order to selectively activate/deactivate fluid flow through some or all of the disk packages 144-152 in order to modify the volume of conditioned fluid being delivered from the water heater/chiller assembly 100, such further contemplating engaging or disengaging the rotation of specified ones of the magnetic/electromagnetic plates 124-134 dependent upon whether specific ones of the disk packages are active or inactive and connecting or disconnecting an electric supply, as well as varying intensity by increasing or decreasing power supply to the electromagnets of the disk packages that are active and engaged, if electromagnets are used, via the motor or other rotary inducing input RPM (input drive) or rotational speed to accomplish best performance in terms of efficiency or COP (coefficient of performance). Beyond the recirculation mode previously described, it is also envisioned that the associated valving/controls for the present assembly can be further designed in order to successively pass conditioned fluid through multiple (including consecutive or non-consecutive) conductive disk packages, such as in order to modify a desired fluid holding or delivery temperature.

Proceeding now to FIG. 3, a further similar perspective illustration is presented at 200 depicting a further two stage thermally conditioning variant of an electromagnetic or magnetic induction water heater/chilling assembly or magnetocaloric heat pump according to a third embodiment of the present invention. As with the previous embodiments 10 and 100, the assembly 200 includes a housing or body of non-limiting design and which is illustrated as a cylindrical body with a side wall 202 closed by a top 204 and bottom 206.

A substantial majority of the housing enclosure is occupied by a large volume tank 208 which leaves a small amount of upper interior space (210) occupied by a motor or input drive 212 (or other rotating drive input) which is bearing supported upon the tank (see at 213) and from which downwardly extends a rotating shaft 214. An inlet line 215 extends from the top 204 of the housing and substantially through a depth of the tank 208 terminating at an open mouth location 216 just above a tank bottom 217. A corresponding outlet line 218 includes a mouth end 220 position just below the top of the tank 208 for retrieving thermally conditioned fluid (heated or cooled) for delivery from the housing.

The lower main enclosure (defined as the interior of the tank 208) is further configured with dual stage upper and lower rotating magnetic/electromagnetic plate arrays in combination with proximately located fluid conditioning conductive disks or plate arrays. The upper magnetic/electromagnetic plate arrays are depicted at 224, 226, 228, 230, 232, and 234 and the lower plate arrays are further depicted at 236, 238, 240, 242, 244, and 246. Both of the plate arrays are secured to the rotating shaft 214 and, as previously described, can include any magnetic/electromagnetic material or can include subset magnetic/electromagnetic elements or locations which can further include individual pockets arranged in a circumferential array for each plate or disk, and within which can be contained any of individual magnets or electromagnets. Without limitation, the magnetic/electromagnetic plates can also integrate any of a variety of rare earth or electromagnetic components arranged in any configuration within and around the circumference of the individual stage one plates 224-234 defining the upper heating zone and the stage two plates 236-246 defining the lower heating zone.

A pair of upper 248 and lower 250 conductive components are provided which are stationary supported within the interior of the main tank enclosure and which respectively include individual rib and spline configurations alternating with the sub-pluralities of magnetic/electromagnetic plates 224-234 and 236-246. As shown, selected upper conductive component 248 includes radial ribs 252, 254, et seq. which interconnect with axial splines 256, 258, et seq., for structurally supporting the conductive components relative to the inter-rotating magnetic/electromagnetic plates and for maximizing thermal conductive flow of the fluid through thermally conditioning (heating and cooling) zones which are optimized at the locations of the inter-rotating magnet/electromagnet arrays for providing conditioned fluid.

By way of further illustration, the internally generated fluid flows within the tank 208 can include the introduced fluid exiting the inlet pipe bottom 216 at arrow 260, at which point it is caused to cyclonically travel (owing to the rotation of the conductive components 248/250 in a given direction) in a combined upward and swirling pattern as further depicted by arrow 262. Upon reaching the top of the tank enclosure, the flow patterns are reversed (arrows 264) and redirected downwardly proximate a center vertical axis of the shaft 214 (arrows 266) so that the fluid is continuously reheated by passing in close proximity to magnetic/electromagnets which can be configured at central locations of the individual upper and lower spaced plate arrays 224-234 and 236-246. At this point, the fluid is redirected outwardly (arrows 268) from the bottom and subsequently upwardly (arrow 270) before being withdrawn through the outlet pipe 218. In this manner, the two stage heating configuration optimizes the properties of thermal transfer (heat or cool) to the immersing fluid.

Figure 4:
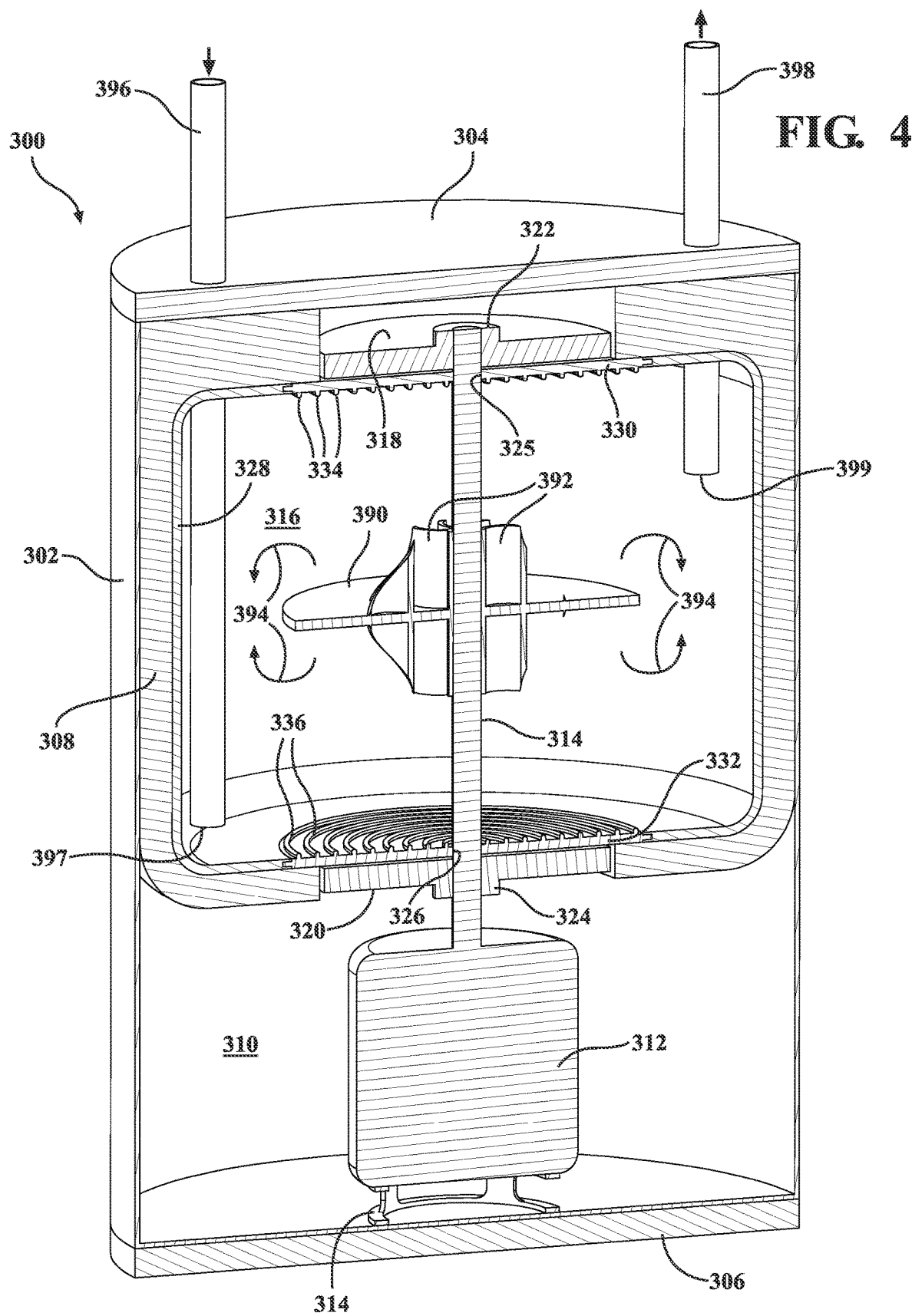
FIG. 4 is a perspective length cutaway illustration of a further embodiment of electromagnetic or magnetic induction water heating/chilling assembly or magnetocaloric fluid heat pump according to a yet further embodiment and illustrating a fluid holding tank contained within a housing, a shaft driven impeller rotatably supported within the tank for imparting a turbulent flow to the fluid, the tank capable of being located as part of either an upper assembly, lower assembly, or both within the housing, the top and bottom interior surfaces of the tank each further including a conductive plate, with upper and lower magnetic/electromagnetic plates being inter-rotatably supported by the shaft such that either of the conductive plates or the magnetic/electromagnetic plates can be rotated relative to one another to create the desired oscillating magnetic fields.

FIG. 4 is a perspective length cutaway illustration, generally at 300, of a further embodiment of electromagnetic or magnetic induction water heating/chilling assembly or magnetocaloric fluid heat pump according to a yet further embodiment. Similar to previous embodiments a housing can include any three dimensional shape and, by non-limiting representation, is depicted having a generally cylindrical configuration with a curved side 302, a top 304 and a bottom 306.

An interior positioned and fluid holding tank is represented at 308 and, according to the non-limiting variant represented occupies a substantial upper interior of the housing such that the tank is secured to the underside of the top 304 and establishes a lower most open space 310 for internally supporting a motor or other rotating input 312 on the bottom 306 of the housing (see further bottom supporting motor bracket 314). A shaft 314 extends upwardly from the motor/rotating input 312 and through a central vertical interior 316 of the tank 308.

A pair of upper and lower magnetic/electromagnetic plates 318 and 320 are positioned within the housing in exterior facing contact with the upper and lower surfaces of the fluid holding tank 308. The plates 318/320 each include axial aligning support locations (see at 322 and 324, respectively for the upper and lower plates 318 and 320) which are secured to the shaft 314 to impart rotation to the upper and lower plates. The top and bottom of the tank 308 also include aligning apertures (see at 325 and 326) through which the shaft 314 extends. Although not shown, additional rotary seals and gaskets are employed within the aperture interfaces between the tank and shaft to prevent leakage of fluid.

The tank includes an inner thermal insulating liner shown at 328. Either or both of the top and bottom of the tank liner further integrates a conductive plate, these shown in the illustrated example by an upper conductive plate 330 and a lower conductive plate 332 and which are positioned in close proximity to the upper 318 and lower 320 shaft supported magnetic/electromagnetic plates. Without limitation, the present assemblies can include pairs of proximately located and inter-rotational magnetic/electromagnetic plates and conductive plates which are positioned at either or both the top and bottom locations of the fluid holding tank. It is further envisioned and understood that either of the magnetic/electromagnetic plates or the proximately located conductive plates can be rotated relative to one another in order to create the desired oscillating fields/eddy currents for providing the necessary thermal conditioning of the fluid.

As shown, the conductive plates 330/332 each include an inside facing pattern or configuration which, in the variant shown, includes pluralities of concentric ridges (see upper inside concentric ridges at 334 for upper plate 330 and lower inside concentric ridges at 336 for lower plate 332). FIGS. 9A-9H further depict a variety of additional non-limiting and alternative conductive plate configurations which can be incorporated into any of the various embodiments of water heating/chilling assemblies or magnetocaloric fluid heat pumps described herein.

With reference FIG. 9A, a first alternative example of a conductive plate is shown at 338 exhibiting a circumferentially arrangement of "S" shaped ridges 340 upon an inside facing surface thereof. A central and interior rim defining aperture 342 is also shown through which extends the rotating shaft (see again at 314 in FIG. 4).

A second alternate example of a conductive plate is depicted in FIG. 9B at 344 having radial extending and circumferentially arrayed linear ridges 346 for providing enhanced thermal conductive properties in contact with the fluid within the tank interior. A central inner rim defining aperture 348 receives the shaft therethrough.

A third alternate example of a conductive plate is shown at 350 in FIG. 9C and includes a further radial and circumferential array of arcuate ridge 352 on a tanker interior facing surface, along with a central shaft receiving rim aperture 354.

A fourth alternate example of a conductive plate is shown at 356 in FIG. 9D, this having a unique and coaxial arranged layering of individual raised or ridged portions including an outermost interconnected arcuate pattern 358, a next succeeding and inner radial spaced and circumferentially extending interconnected arcuate pattern 360, an inward radial spaced and next succeeding pattern of circular projections 362, succeeding inner pseudo-circular projections 364 and 366 and central rim aperture 368.

FIG. 9E re-presents the conductive plates 330 and 332 shown in FIG. 4. FIG. 9F presented a fifth alternate example of a conductive plate 370 exhibiting a plurality of individual posts 372 arranged on an inside facing surface with a central rim aperture 374.

FIG. 9G presents a sixth alternate example of a conductive plate 376 in which a central trough 378 separates outer and inner radial spaced coaxial locations. A central shaft receiving aperture is shown at 382. Without limitation, the open cavity can further be enclosed with a lid construction.

FIG. 9H further presents a seventh alternate example of a conductive plate 384 which is analogous to that shown at 330/332 and depicts a tighter spaced plurality of smaller concentric ridges 386 in combination with a central rim defining aperture 388.

Referring again to FIG. 4, a non-limiting example of a fluid agitating component is depicted by an impeller having any suitable material construction is mounted to the shaft 314 within the tank interior and includes a radial plate 390 which interfaces with vertical projecting and fluid redirecting/turbulent flow promoting portions 392. Upon being rotated, the impeller causes internal fluid flow agitation (see fluid flow patterns 394 imparted to the tank interior) and which occurs simultaneous with inter-rotation of the magnetic/electromagnetic plates relative to the conductive plates for thermally conditioning the interior held fluid (e.g. water) within the tank 308.

Finally, a fluid inlet pipe or conduit is shown at 396 for introducing fluid/water through location 397 into the tank interior 316. A fluid outflow pipe or conduit is further shown at 398 and includes an interior location 399 for withdrawing thermally conditioned water from the tank interior 316 for any desired external use or application.

As with any of the preceding or subsequent described embodiments, any suitable arrangement of sensors or controls can also be integrated into the water heater/chiller assemblies for maintaining the water in the tank at a desired temperature. This can also include the motor/rotating input operating at varying speeds in order to both initially thermally condition and iteratively maintain the temperature of the fluid within the tank. The material construction of the tank insulating liner 328 can further be optimized to assist in maintaining the thermal properties of the fluid held within the tank interior 316.

Figure 5:
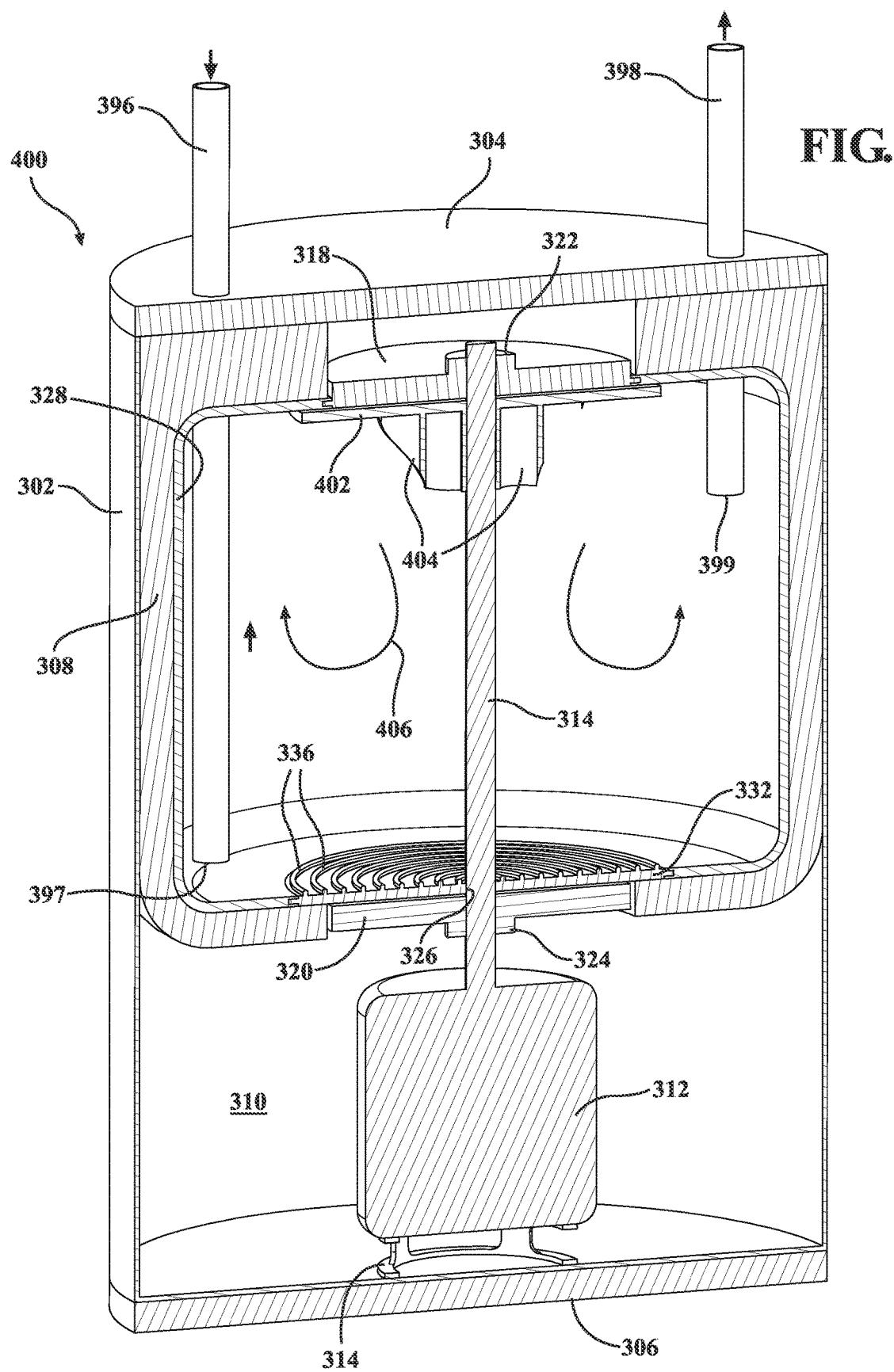
FIG. 5 is a perspective length cutaway of a sub-variant of FIG. 4 and in which either of the upper or lower conductive plate (the upper conductive plate being shown) is reconfigured as an impeller at an upper inside interior of the tank, it further being envisioned that either of the magnetic/electromagnetic plates or conductive plates can be alternatively rotated.

Proceeding to FIG. 5, a perspective length cutaway is generally shown at 400 of a sub-variant of FIG. 4 and in which identical components are identically numbered. An upper conductive plate 402 rotatably supported by the shaft is reconfigured as an impeller in this embodiment and which is located at an upper inside interior of the tank 308, it further being envisioned that either of the magnetic/electromagnetic plates 318/320 or conductive plates (upper 402 or lower 332) can be alternatively rotated. Also shown are vertical projecting and fluid redirecting/turbulent flow promoting portions 404 which extend downwardly from the upper impeller plate 402 and which, upon rotation of the shaft, create inner turbulent flow patterns depicted at 406.

Figure 6:
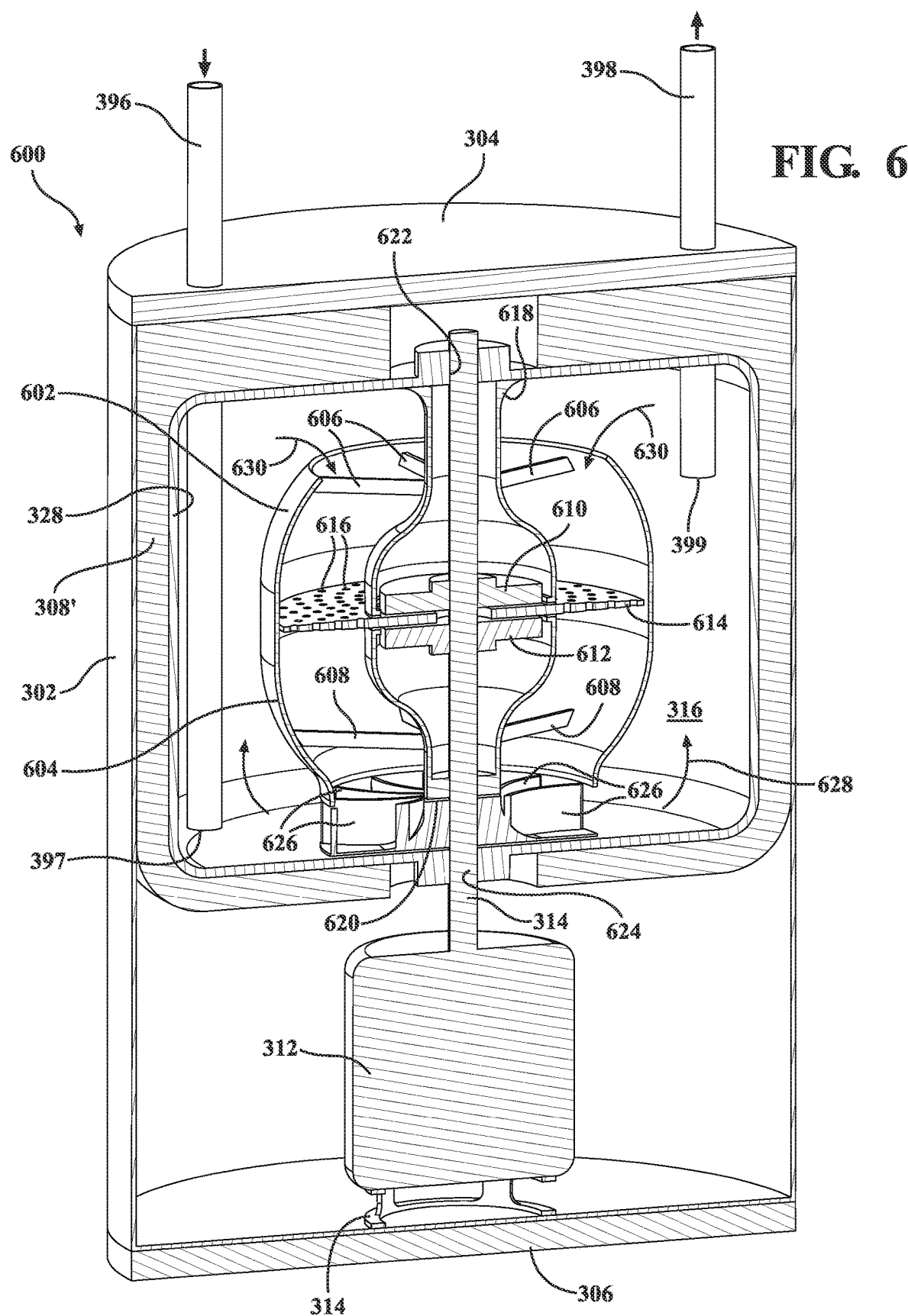
FIG. 6 is a perspective length cutaway of a further variant of an electromagnetic or magnetic induction water heating/chilling assembly or magnetocaloric fluid heat pump in which the impeller, conductive plate and magnetic/electromagnetic plates are incorporated into the fluid holding tank interior (the magnetic plates being insulated from the fluid) in combination with an internal baffle configuration for increasing any of agitation, redirection or turbulence to the fluid flow.

FIG. 6 is a perspective length cutaway, generally at 600, of a further variant of an electromagnetic or magnetic induction water heating/chilling assembly or magnetocaloric fluid heat pump. Again, identical components to the related embodiments of FIGS. 4 and 5 are repetitively numbered.

The variant of FIG. 6 includes a reconfigured inner tank 308' which is again mount within an upper interior of the housing 302. An interior baffle housing includes an outer shell or layer 602 and an inner shell of layer 604 which are supported around the central positioned shaft 314 within the tank interior 316. Upper and lower sets of brackets, at 606 and 608, are provided which extend from the inner shell 604 for supporting the outer shell 602, with each of the shells exhibiting a vertically extending and arcuate shape.

A pair of rotating magnetic/electromagnetic plates 610/612 are provided which secure to the shaft 314 at a generally central interior location of the baffle housing which is insulated from the fluid within the tank. A conductive plate 614 is secured to an inside surface of the outer shell/layer 602 and such that the upper and lower plates 610/612 a rotatably driven in close proximity to the conductive plate. As further shown, the conductive plate 614 exhibits a plurality of interior apertures 616, it being understood that any of the alternate conductive plates designs of FIGS. 9A-9H capable of being substituted for that shown.

The inner shell or layer 604 of the baffle housing is further secured to top and bottom interior locations of the tank interior, see at 618 and 620 respectively. The tank 308' is further reconfigured so that axial rotatable shaft supports are depicted at 622 and 624 at upper and lower ends. Also depicted are reconfigured and radial arcuate impeller portions 626 which secure to the shaft 314 below the inner 604 and outer 602 shell layers and which, upon rotation of the shaft, provide for circulation of the fluid around and through the conductive and thermal transfer/conditioning plate 614. Fluid patterns associated with the operation of the system are further depicted by directional flow arrows 628 and 630 and which facilitate the thermal conditioning of the fluid or water and for increasing any of agitation, redirection or turbulence to the fluid flow.

Figure 7:
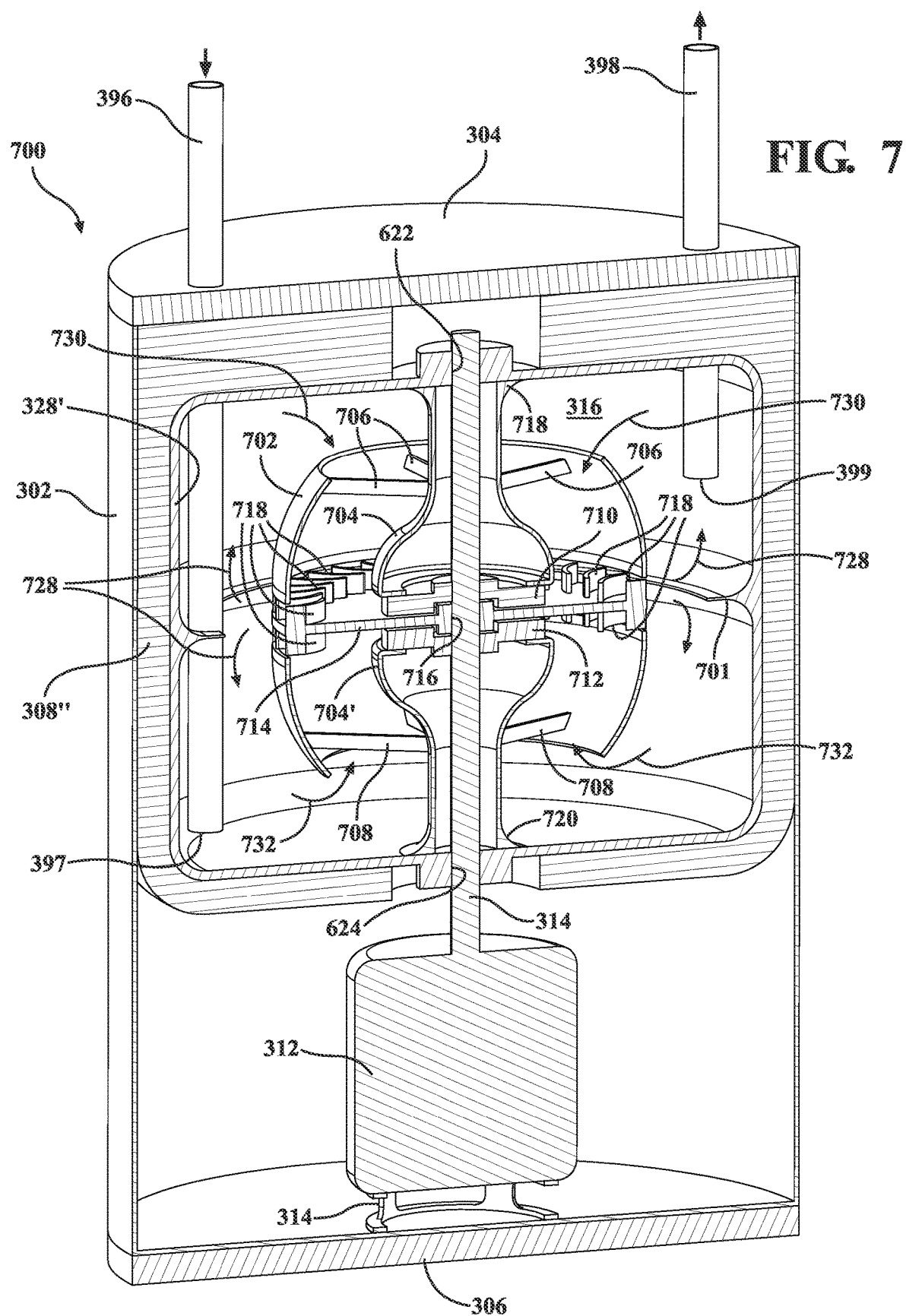
FIG. 7 is an illustration of a sub-variant of FIG. 6 illustrating a reconfiguration of the tank interior conductive plate for thermally conditioning the surrounding fluid.

FIG. 7 is an illustration, generally at 700, of a sub-variant of FIG. 6 and illustrating a reconfiguration of the tank interior conductive plate for thermally conditioning the surrounding fluid. Identical components are again repetitively numbered. The tank is further reconfigured at 308" and includes an inner tapered rim 701 at a midpoint encircling location of the liner, as further reconfigured at 328'.

A variation of the interior baffle housing of FIG. 6 includes an outer shell or layer 702 and an inner shell of layer which is further subdivided into upper 704 and lower 704' mirroring and axially spaced halves and which are supported around the central positioned shaft 314 within the tank interior 316. Upper and lower sets of brackets, at 706 and 708, are provided which extend from the inner shell layer halves 704/704' for supporting the outer shell 702 and which each again exhibit a vertically extending and arcuate shape.

In contrast to FIG. 6, a pair of magnetic/electromagnetic plates 710/712 are provided which are secured to opposing end surfaces of the inner baffle shells 704/704' and so that they define a material spacing therebetween. Central apertures in the plates 710/712 align to receive the shaft 314 extending there-through in a rotationally supported fashion.

A conductive plate 714 is secured to the shaft 314 so that it can rotated within the opposing space between and in close proximity to the plates 710/712. As further shown, the conductive plate 714 includes a central mounting aperture 716 as well as an outer circumferential array of vanes 718 integrated into the conductive plate and extending both above and below to assist in facilitating simultaneous conductive heating and fluid flow redirection and recirculation of the fluid. It is again understood that any of the alternate conductive plate designs of FIGS. 9A-9H are capable of being substituted for that shown.

The inner shell split layers 704/704' of the baffle housing are both secured to top and bottom interior locations of the tank interior, see at 718 and 720 respectively. The tank 308" is further reconfigured so that axial rotatable shaft supports are depicted as again shown at 622 and 624 at upper and lower ends. Fluid patterns associated with the operation of the system are further depicted by directional flow arrows at each of midpoint 728, upper interior 730 and lower interior 732 locations which facilitate the thermal conditioning of the fluid or water and for increasing any of agitation, redirection or turbulence to the fluid flow.

Figure 8A:
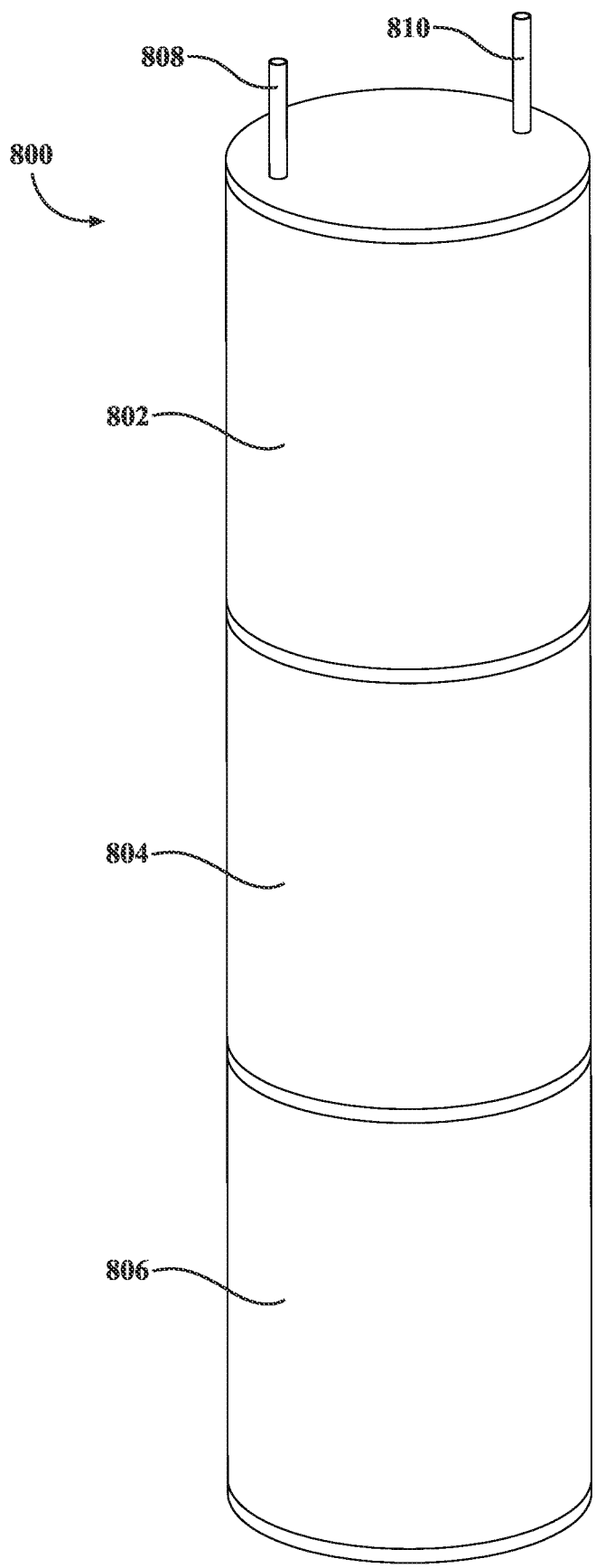
FIG. 8A is an illustration of an electromagnetic or magnetic induction water heating/chilling assembly or magnetocaloric fluid heat pump according to a further embodiment of the present invention and including a stacked scalable or multi-stage modular configuration for providing any of increased fluid volume or temperature.

Proceeding to FIG. 8A, an illustration is generally shown at 800 of an electromagnetic or magnetic induction water heating/chilling assembly or magnetocaloric fluid heat pump according to a further embodiment of the present invention. A plurality of individual units, modules or subassemblies are shown at 802, 804 and 806 arranged in a stacked scalable or multi-stage modular configuration for providing any of increased fluid volume or temperature.

Inlet 808 and outlet 810 conduits are shown and which provide for delivery of water or other fluid in succession within the individual scalable units and which can each incorporate any of the subset designs described in FIGS. 1-7. It is understood that the individual modules 802, 804, 806, et. seq., can be provided with removable top and bottom portions associated with each outer subset housing, along with the ability to reconfigure the fluid carrying lines to operate in series or parallel any number of modules or units.

Figure 8B:
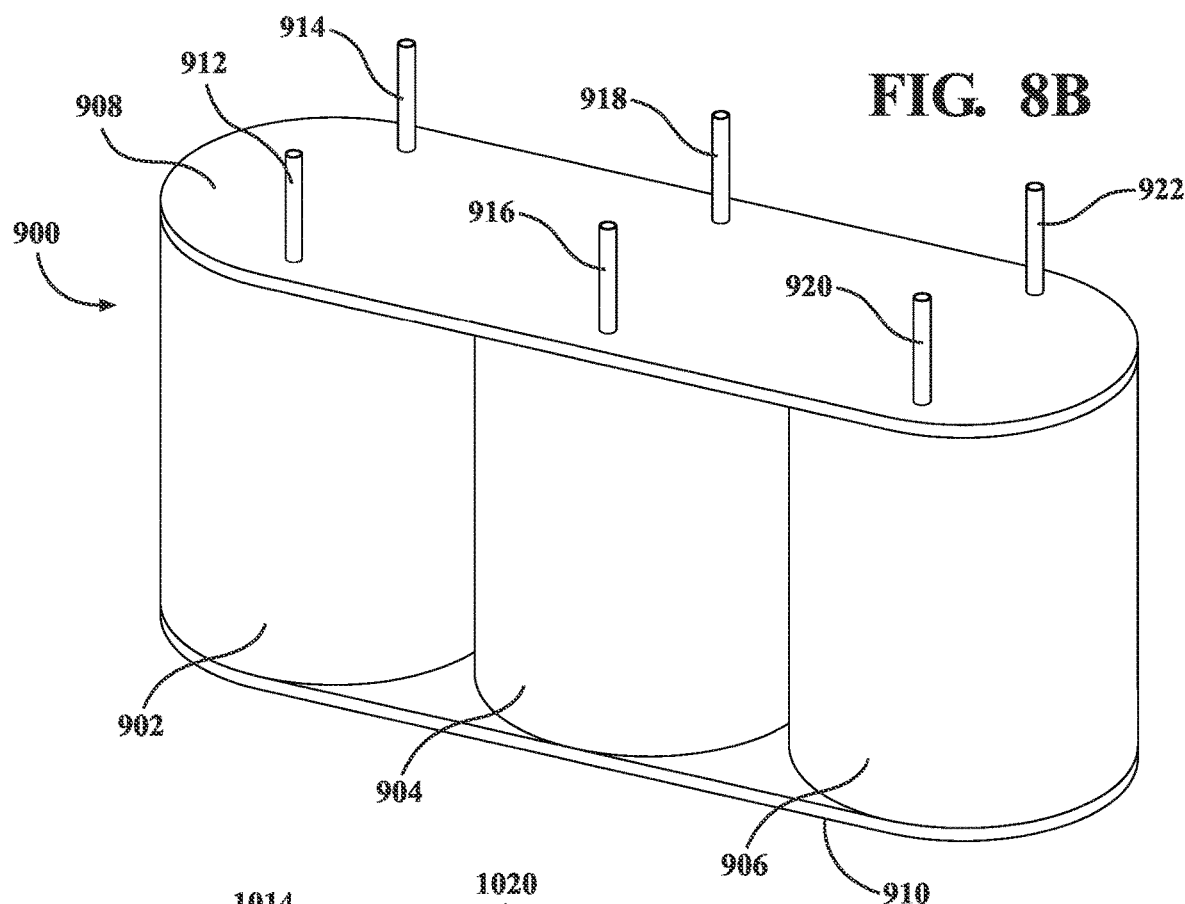
FIG. 8B is an illustration of an alternate variant of FIG. 8A in which the modularized construction of multiple units are shown in a single tier and linear supported arrangement.

FIG. 8B is an illustration, generally at 900, of an alternate variant of FIG. 8A in which the modularized construction of multiple units, see as referenced at 902, 904, 906, et. seq., are shown in a single tier and linear supported arrangement between upper 908 and lower 910 support plates. Individual inlet/outlet fluid conduits are referenced by pair 912/914 for unit 902, pair 916/918 for unit 904 and pair 920/922 for unit 906.

Figure 8C:
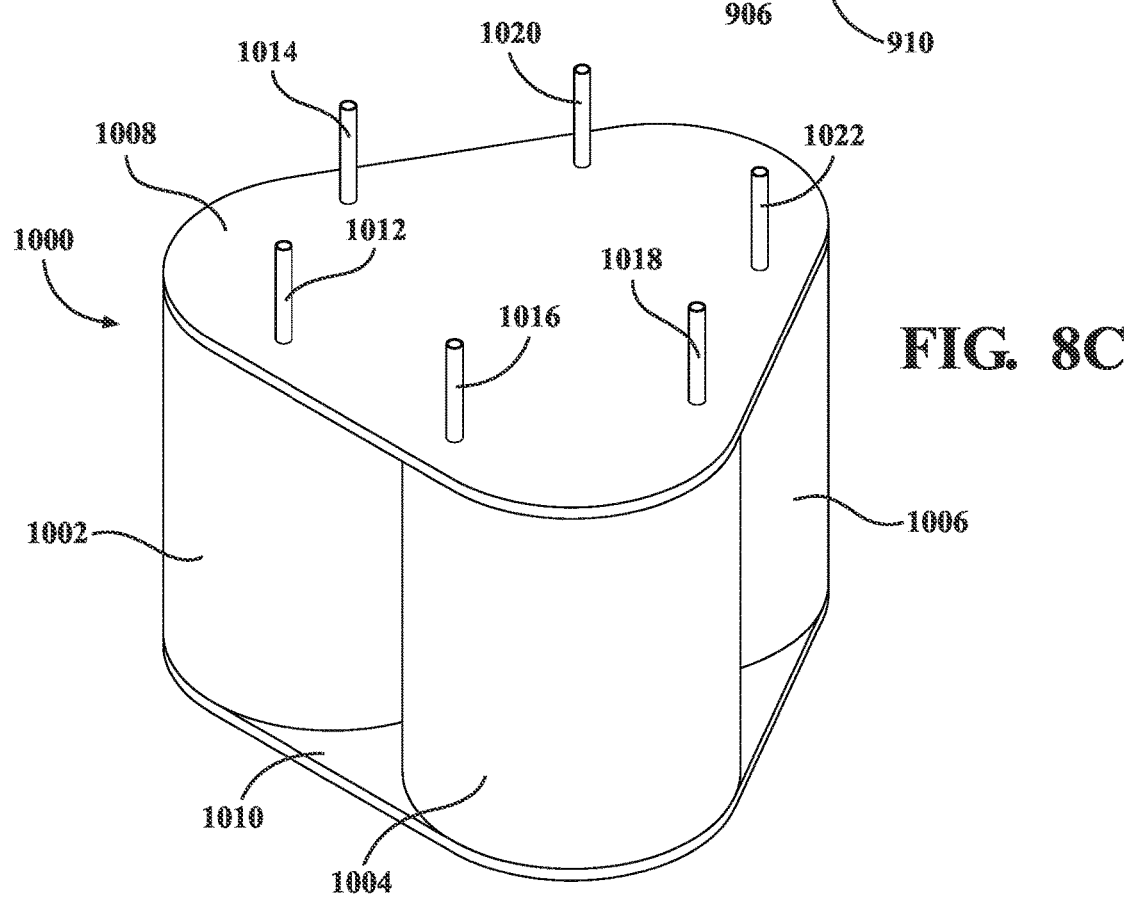
FIG. 8C is an illustration of a further alternate variant in which the modularized construction of the multiple units are reconfigured in a single tier triangular arrangement.

FIG. 8C is an illustration, generally at 1000, of a further alternate variant in which the modularized construction of the multiple units are reconfigured in a single tier triangular arrangements as referenced by modular units 1002, 1004 and 1006 supported between reconfigured upper plate 1008 and lower sandwiching plate 1010. Individual inlet/outlet fluid conduits are referenced by pair 1012/1014 for unit 1002, pair 1016/1018 for unit 1004 and pair 1020/102222 for unit 1006. Without limitation, the present invention contemplates any other scalable or modularize-able options beyond those shown herein for adapting the present variants to changing output requirements for providing thermally conditioned fluid such as hot water.

Without limitation, the configuration and material selection for each of the conductive plates, conductive components or conductive elements are such that they can be selected from any conductive materials which can include varying patterns of materials, bi-materials or multi-materials designs, such including any of metals or alloys, ceramics or any metal ceramic composite materials with ferromagnetic, ferrimagnetic, antiferromagnetic, paramagnetic or diamagnetic properties.

Given the above description, the present invention additionally envisions numerous techniques, teachings and factors for modifying the temperature range of heating/cooling or which can be accomplished for the variants described herein. This can include modifying the rotational speed (such as measured in RPM's or revolutions per minute) of the magnetic plates, thereby affecting the magnetic or electromagnetic induction (magnetic field created) and, consequently, adjusting the eddy currents created in the conductive disk packagers (sandwiched plates with interior fluid carrying pathways). With higher rotation the oscillating high frequencies of the magnetic/electromagnetic induction increases the temperature in the case of heating and also creates higher demagnetization forces (once the magnetic/electromagnetic induction is "off") that can absorb more heat if exposed to a fluid flow (in the case of inductive cooling).

As previously described, other and additional envisioned applications can include adapting the present technology for use in magnetic heat pump (MHG) applications, such utilizing a magneto-caloric effect (MCE) provide either of heating or cooling properties resulting from the magnetization (heat) or demagnetization (cold) cycles. The goal in such applications is to achieve a coefficient of performance (defined as a ratio of useful heating or cooling provided to work required) which is greater than 1.0. In such an application, the system operates to convert work to heat as well as additionally pumping heat from a heat source to where the heat is required (and factoring in all power consuming auxiliaries). As is further known in the relevant technical art, increasing the COP (such as potentially to a range of 2.0-3.5 or upwards) further results in significantly reduced operating costs in relation to the relatively small input electrical cost required for rotating the conductive plate(s) relative to the magnetic plate(s). Such considerations were generally limited to un-implementable ideas specifically related to heating operations. Such magnetic refrigeration techniques result in a cooling technology based on the magneto-caloric effect and which can be used to attain extremely low temperatures within ranges used in common refrigerators, such as without limitation in order to reconfigure the present system as a water chiller.

As is further known in the relevant technical art, the magneto-caloric effect is a magneto-thermodynamic phenomenon in which a temperature change of a suitable material is again caused by exposing the material to a changing magnetic field, such being further known by low temperature physicists as adiabatic (defined as occurring without gain or loss of heat) demagnetization. In that part of the refrigeration process, a decrease in the strength of an externally applied magnetic field allows the magnetic domains of a magneto-caloric material to become disoriented from the magnetic field by the agitating action of the thermal energy (phonons) present in the material.

If the material is isolated so that no energy is allowed to (re)migrate into the material during this time, (i.e., again the adiabatic process) the temperature drops as the domains absorb the thermal energy to perform their reorientation. The randomization of the domains occurs in a similar fashion to the randomization at the curie temperature of a ferromagnetic, ferrimagnetic, paramagnetic or diamagnetic material, except that magnetic dipoles overcome a decreasing external magnetic field while energy remains constant, instead of magnetic domains being disrupted from internal ferromagnetism (or paramagnetism) as energy is added. Applications of this technology can include, in one non-limited application, the ability to heat a suitable alloy arranged inside of a magnetic field as is known in the relevant technical art, causing it to lose thermal energy to the surrounding environment which then exists the field cooler than when it entered.

Other envisioned applications include the ability to generate heat for conditioning the water utilizing either individually or in combination rare earth magnets placed into a high frequency oscillating magnetic field as well as static electromagnetic field source systems including such as energized electromagnet assemblies which, in specific instances, can be combined together within a suitable assembly not limited to that described and illustrated herein and for any type of electric induction, electromagnetic and magnetic induction application. It is further envisioned that the present assembly can be applied to any material which is magnetized, such including any of diamagnetic, paramagnetic, and ferromagnetic materials without exemption also referred to as magnetocaloric materials (MEMs).

Additional factors include the ability to reconfigure the assembly so that the frictionally heated fluid existing between the overlapping rotating magnetic and stationary fluid communicating conductive plates may also include the provision of additional fluid mediums (both gaseous and liquid state) for better converting the heat or cooling configurations disclosed herein. Other envisioned applications can include the provision of capacitive and resistance (ohmic power loss) designs applicable to all materials/different configurations as disclosed herein.

In one non-limiting example, the present invention also envisions, in addition to the assembly as shown and described, the provision of any suitable programmable or software support mechanism, such as including a variety of operational modes. Such can include an Energy Efficiency Mode: step threshold function at highest COP (at established motor or input drive rpm) vs Progressive Control Mode: ramp-up curve at different rpm/COPs). Other modes may include a quick heating mode to speed up initial heating based on various heating profiles. In one non-limiting example, the fluid conditioning system described includes a controller configured to implement various operational modes.

Other heat/cooling adjustment variables can involve modifying the degree of magnetic friction created, such as by varying the distance between the conductive fluid circulating disk packages and alternating arranged magnetic/electromagnetic plates. A further variable can include limiting the exposure of the conductive fluid (gas, liquid, etc.,) to the conductive component/linearly spaced disk packages, such that a no flow condition may result in raising the temperature (and which can be controllable for certain periods of time).

As is further generally understood in the technical art, temperature is limited to Curie temperature, with magnetic properties associated with losses above this temperature. Accordingly, rare earth magnets, including such as neodymium magnets, can achieve temperature ranges upwards of 900° C. to 1000° C.

Ferromagnetic, paramagnetic or diamagnetic Materials, such as again which can be integrated into the conductive plates, can include any of Iron (Fe) having a Curie temperature of 1043K (degrees Kelvin), Cobalt (Co) having a Curie temperature of 1400K, Nickel (Ni) having a Curie temperatures of 627K and Gadolinium (Gd) having a Curie temperature of 292K.

The Curie point, also called Curie Temperature, defines a temperature at which certain magnetic materials undergo a sharp change in their magnetic properties. In the case of rocks and minerals, remanent magnetism appears below the Curie point—about 570° C. (1,060° F.) for the common magnetic mineral magnetite. Below the Curie point—by non-limiting example, 770° C. (1,418° F.) for iron—atoms that behave as tiny magnets spontaneously align themselves in certain magnetic materials.

In ferromagnetic materials, such as pure iron, the atomic magnets are oriented within each microscopic region (domain) in the same direction, so that their magnetic fields reinforce each other. In antiferromagnetic materials, atomic magnets alternate in opposite directions, so that their magnetic fields cancel each other. In ferrimagnetic materials, the spontaneous arrangement is a combination of both patterns, usually involving two different magnetic atoms, so that only partial reinforcement of magnetic fields occurs.

Given the above, raising the temperature to the Curie point for any of the materials in these three classes entirely disrupts the various spontaneous arrangements, and only a weak kind of more general magnetic behaviour, called paramagnetism, remains. As is further known, one of the highest Curie points is 1,121° C. (2,050° F.) for cobalt. Temperature increases above the Curie point produce roughly similar patterns of decreasing paramagnetism in all three classes of materials such that, when these materials are cooled below their Curie points, magnetic atoms spontaneously realign so that the ferromagnetism, antiferromagnetism, or ferrimagnetism revives. As is further known, the antiferromagnetic Curie point is also referenced as the Neel temperature.

Other factors or variable controlling the temperature output can include the strength of the magnets or electromagnets which are incorporated into the plates 64-74, such as again by selected rare earth magnets having varying properties or, alternatively, by adjusting the factors associated with the use of electromagnets including an amount of current through the coils, adjusting the core ferromagnetic properties (again though material selection) or by adjusting the coil winding density around the associated core.

Other non-limiting temperature adjustment features can include modifying the size, number, location and orientation of the assemblies (elongated and plural magnet/electromagnet and alternative conductive plates). Multiple units or assemblies can also be stacked, tiered or otherwise ganged in order to multiply a given volume of conditioned fluid which is produced.

Additional non-limiting features can include varying the designing of the conductive disk packages or components, such as not limited varying a thickness, positioning or configuration of a blade or other fluid flow redirecting profile integrated into the conductive plates, as well as utilizing the varying material properties associated with different metals or alloys, such including ferromagnetic, paramagnetic and diamagnetic properties.

Having described the exemplary embodiments and features herein, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are included in light of the disclosure. Having thus described embodiments of the present disclosure, a person of ordinary skill in the art will recognize that changes may be made in form and detail without departing from the scope of the present disclosure. Thus, the present disclosure is limited only by the claims and is understood according to the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more individual separated or integrated manner, as is useful in accordance with a particular application. Additionally, any signal hatches in the drawings/figures should be considered only as exemplary, and not limiting, unless otherwise specifically specified.

I claim:

1. A fluid conditioning assembly, comprising:
 a housing containing a fluid holding tank to which is communicated each of an inlet pipe and an outlet pipe;
 a drive shaft supported within said housing and extending within said tank, said shaft rotatably supporting a fluid agitating component;
 at least one magnetic or electromagnetic plate supported within either of said housing or tank;
 a fluid conditioning and conductive component supported within said tank and in proximity to said at least one magnetic or electromagnetic plate;
 said fluid conditioning and conductive component further including top and bottom conductive plates integrated into a liner of said tank;
 said at least one magnetic or electromagnetic plate further including a pair of top and bottom plates arranged within said housing outside of said tank; and
 said drive shaft rotating either of said magnetic/electromagnetic plate or said conductive component, resulting in oscillating magnetic fields being generated, with the fluid within said tank being thermally conditioned.

2. The fluid conditioning assembly of claim 1, said fluid agitating component further comprising an impeller with fluid redirecting components.

3. The fluid conditioning assembly of claim 2, further comprising said impeller being constructed of a conductive material and arranged in proximity to a selected one of said at least one magnetic or electromagnetic for creating additional oscillating magnetic fields within said tank.

4. The fluid conditioning assembly of claim 1, said fluid agitating component further comprising a baffle housing having inner and outer shells enclosing said magnetic or electromagnetic plates and said conductive component.

5. The fluid conditioning assembly of claim 1, said conductive component further comprising a plate exhibiting any plurality of thermal conditioning and fluid redirecting elements projecting from a surface of said plate.

6. The fluid conditioning assembly of claim 1, further comprising a motor or other input drive for rotating said shaft.

7. The fluid conditioning assembly of claim 1, said housing further comprising a plurality of individual housings arranged in a scaled or modularized configuration.

* * * * *